United States Patent
Yoshioka et al.

(10) Patent No.: US 12,255,545 B2
(45) Date of Patent: Mar. 18, 2025

(54) INVERTER DEVICE FOR CAPABLE OF PERFORMING OVERHEATING PROTECTION TO SWITCHING ELEMENTS WHEN DRIVING ELECTRIC MOTOR AND CONTROL METHOD THEREOF

(71) Applicant: NIDEC ELESYS CORPORATION, Kanagawa (JP)

(72) Inventors: Hirotaka Yoshioka, Kanagawa (JP); Jun Katsumata, Kanagawa (JP); Toshiyuki Watanabe, Kanagawa (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 244 days.

(21) Appl. No.: 17/752,875

(22) Filed: May 25, 2022

(65) Prior Publication Data
US 2022/0385207 A1 Dec. 1, 2022

(30) Foreign Application Priority Data
May 26, 2021 (CN) .................. 202110576589.X

(51) Int. Cl.
*H02M 7/537* (2006.01)
*H02P 6/08* (2016.01)
(Continued)

(52) U.S. Cl.
CPC .............. *H02M 7/537* (2013.01); *H02P 6/08* (2013.01); *H02P 27/06* (2013.01); *H02P 29/60* (2016.02); *H02M 1/084* (2013.01)

(58) Field of Classification Search
CPC .. H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 5/40; H02M 5/42; H02M 5/453; H02M 7/7575;
(Continued)

(56) References Cited

U.S. PATENT DOCUMENTS 9,114,519 B2 * 8/2015 Iwata ................. B25B 23/1475
2003/0155878 A1 * 8/2003 Murai ................ H02P 21/0085
318/268
(Continued)

FOREIGN PATENT DOCUMENTS

JP 3684871 8/2005

*Primary Examiner* — Jeffrey A Gblende
*Assistant Examiner* — Nusrat Quddus
(74) *Attorney, Agent, or Firm* — JCIPRNET

(57) ABSTRACT

The disclosure provides an inverter device for driving an electric motor, including: an inverter circuit including a plurality of switching elements; and a control circuit controlling the inverter circuit. When a rotation speed of the electric motor is equal to or less than a preset rotation speed threshold and a torque of the electric motor is equal to or greater than a preset torque threshold, the control circuit changes a temperature estimation logic of the switching elements of the inverter circuit.

2 Claims, 5 Drawing Sheets

(51) Int. Cl.
  *H02P 27/06* (2006.01)
  *H02P 29/60* (2016.01)
  *H02M 1/084* (2006.01)

(58) Field of Classification Search
  CPC ...... H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 2001/4275; H02M 2001/4283; H02M 2001/4291; H02J 3/46; H02J 3/38; H02J 3/36; H02J 3/01; H02H 7/261; H02H 7/268; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17
  See application file for complete search history.

(56) References Cited

U.S. PATENT DOCUMENTS

| | | | |
|---|---|---|---|
| 2009/0096395 A1* | 4/2009 | Nakayama | H02P 6/34 318/434 |
| 2012/0249024 A1* | 10/2012 | Saha | B60L 15/025 318/400.02 |
| 2021/0036645 A1* | 2/2021 | Yokoyama | H02P 6/06 |
| 2021/0044247 A1* | 2/2021 | Namiki | B60L 3/00 |

* cited by examiner

INVERTER DEVICE FOR CAPABLE OF PERFORMING OVERHEATING PROTECTION TO SWITCHING ELEMENTS WHEN DRIVING ELECTRIC MOTOR AND CONTROL METHOD THEREOF

CROSS REFERENCE TO RELATED APPLICATIONS

The present invention claims priority under 35 U.S.C. § 119 to China Application No. 202110576589.X filed on May 26, 2021 the entire content of which is incorporated herein by reference.

FIELD OF THE INVENTION

The disclosure relates to an inverter device for driving an electric motor and a control method thereof, and particularly relates to a technology for protecting switching elements in the inverter device from overheating.

BACKGROUND

When an inverter circuit is used to supply power to an electric motor to rotate the electric motor, the inverter circuit uses switching elements such as IGBTs and FETs to perform high-frequency and high-power power conversion so these switching elements generate heat due to switching loss. In order to prevent the switching elements from malfunctioning due to overheating, it is necessary to consider providing overheating protection for the switching elements.

In the related art, in order to prevent overheating of the switching elements or the inverter device, a thermistor or the like is disposed to directly detect the temperature of the switching elements, etc. When the detected temperature exceeds a threshold, the power output from the inverter circuit to the electric motor is limited or the electric motor is stopped so as to reduce the risk of overheating of the switching elements.

However, since a temperature detector is disposed, it is required to consider not only the insulation issue but also the delay when measuring the switching element that operates at a high frequency. Therefore, sometimes the detected temperature value may not accurately reflect the current actual temperature of the switching element. In order to improve the accuracy of temperature measurement, a generally adopted method is to estimate the temperature of the switching element from the current flowing through each switching element. By estimating the temperature value with such high accuracy, the overheating state of the switching element, etc. may be accurately grasped to perform overheating protection.

On the other hand, when a large torque is applied to the electric motor but the rotation speed changes drastically (suddenly), for example, when the vehicle encounters an obstacle or the vehicle climbs a hill, which causes the rotation speed of the electric motor to suddenly drop to a very low level or even stop (the so-called "electric motor lock state") while the torque applied to the electric motor is still very large, the estimated temperature value obtained by the above-mentioned temperature estimation method may be less than the actual temperature value of the switching element, and the difference therebetween increases as the rotation speed decreases. In such a case, the switching element may not be accurately protected from overheating by using the estimated temperature value, and the switching element is likely to fail or even burn out due to overheating.

Moreover, in the above-mentioned electric motor lock state, the current may be concentrated on one of the phases of the multi-phase winding of the electric motor, and as a result, the switching element corresponding to this phase rapidly heats up, and the switching element may be damaged due to overheating before it is detected that the switching element is in an overheated state.

For the above situation, in the related art, when it is determined that the electric motor is currently in the lock state according to the rotation speed and torque of the electric motor and the temperature of the switching element, the carrier frequency of the control signal is decreased and the frequency of the switching operation of the switching element is reduced so as to protect the switching element from overheating.

In addition, the temperature of the switching element is detected by using a thermistor or the like, and the carrier frequency of the control signal is determined based on the detected temperature and the torque command value when the electric motor lock state is detected so as to perform overheating protection.

SUMMARY

An inverter device for driving an electric motor according to an exemplary embodiment of the disclosure includes: an inverter circuit including a plurality of switching elements; and a control circuit controlling the inverter circuit. In response to a rotation speed of the electric motor being equal to or less than a preset rotation speed threshold and a torque of the electric motor being equal to or greater than a preset torque threshold, the control circuit changes a temperature estimation logic of the switching elements of the inverter circuit.

An inverter device for driving an electric motor according to an exemplary embodiment of the disclosure includes: an inverter circuit including a plurality of switching elements; and a control circuit controlling the inverter circuit. The control circuit changes a temperature estimation logic of the switching elements of the inverter circuit while a rotation speed of the electric motor increases to a first rotation speed value and then temporarily drops equal to or less than a second rotation speed value in a stage when the electric motor is just started.

A control method of an inverter device for driving an electric motor according to an exemplary embodiment of the disclosure includes: determining whether a rotation speed of the electric motor is equal to or less than a preset rotation speed threshold and whether a torque of the electric motor is equal to or greater than a preset torque threshold; and changing a temperature estimation logic of a switching element of an inverter circuit of the inverter device for driving the electric motor in response to the rotation speed of the electric motor being equal to or less than the rotation speed threshold and the torque of the electric motor being equal to or greater than the torque threshold.

The above and other elements, features, steps, characteristics and advantages of the present disclosure will become more apparent from the following detailed description of the preferred embodiments with reference to the attached drawings.

DETAILED DESCRIPTION

Hereinafter, embodiments of the disclosure will be specifically described with reference to the accompanying drawings. The contents described herein and the accompanying drawings are merely examples of the disclosure, and are not intended to limit the disclosure.

Figure 1:
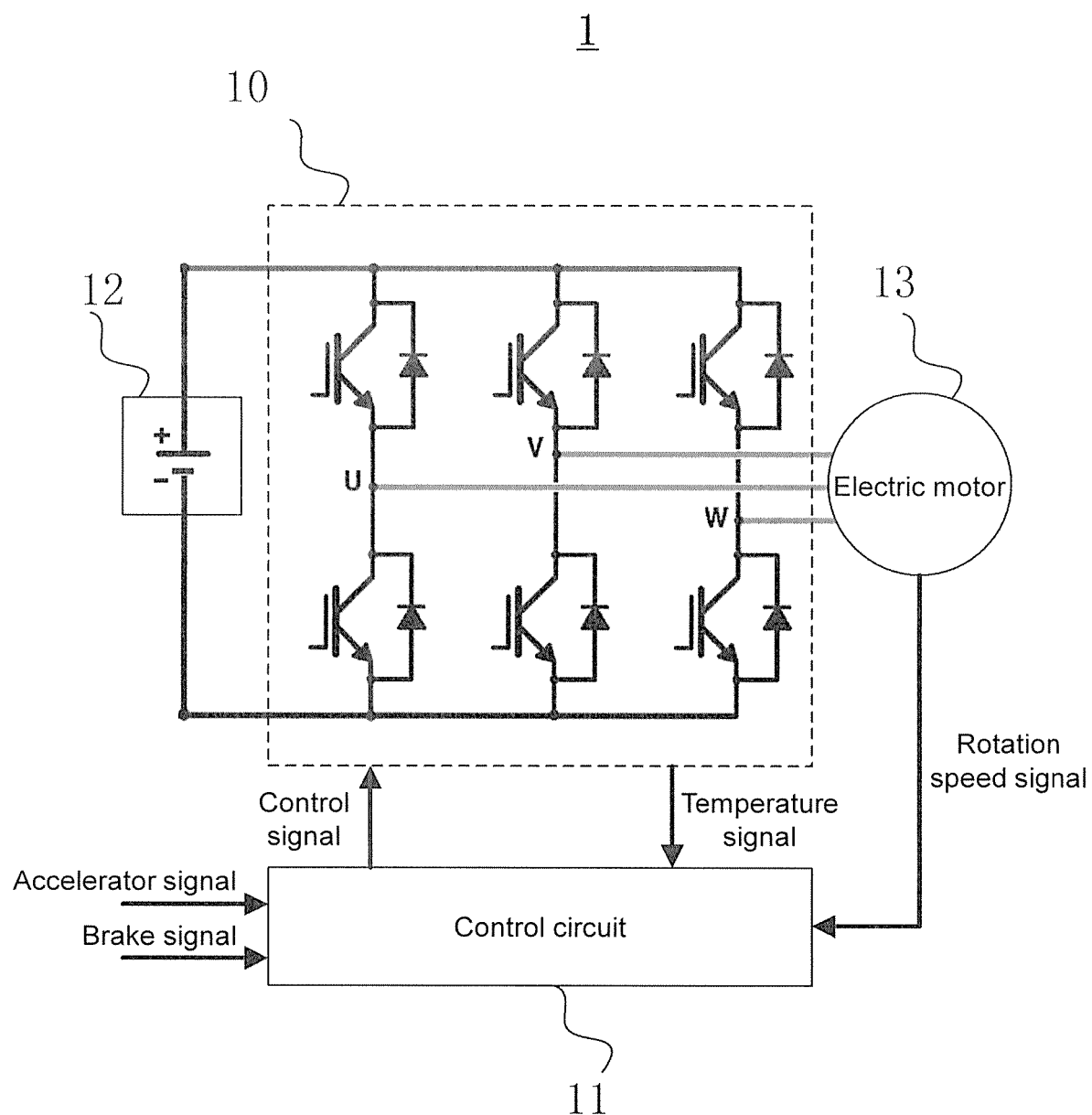
FIG. 1 is a block diagram showing the configuration of the inverter device 1 for driving the electric motor according to Embodiment 1 of the disclosure.

Hereinafter, an inverter device 1 for driving an electric motor according to Embodiment 1 of the disclosure will be described with reference to FIG. 1. FIG. 1 is a block diagram showing the configuration of the inverter device 1 for driving the electric motor (hereinafter simply referred to as the inverter device).

As shown in FIG. 1, the inverter device 1 includes an inverter circuit 10 and a control circuit 11. The inverter device 1 is powered by a power supply 12 and drives the electric motor 13. The power supply 12 here is a DC power supply, and the electric motor 13 is, for example, a three-phase (U, V, W) electric motor, but may also be a four-phase or five-phase electric motor, or an electric motor with more phases.

The inverter circuit 11 converts the DC power supplied from the power supply 12 into AC power (three-phase AC power in this embodiment), and supplies power to the electric motor 13. In FIG. 1, the inverter circuit 10 is defined by three-phase (U-phase, V-phase, W-phase) bridge circuits corresponding to the three-phase coils (U-phase coil, V-phase coil, W-phase coil) provided in the electric motor 13. The circuit of each phase includes two switching elements (a total of six switching elements). The three-phase switching elements on the upper side in the figure define the upper arm, and the three-phase switching elements on the lower side in the figure define the lower arm. The connection points of the upper and lower arm switching elements of each phase are respectively connected to the coils of the corresponding phase of the electric motor 13. A MOSFET (Metal Oxide Semiconductor Field Effect Transistor) is used as each switching element in FIG. 1, but a power semiconductor element such as an IGBT (Insulated Gate Bipolar Transistor) may be used as the switching element.

The control circuit 11 may be realized by an ECU (Electronic Control Unit) that has a CPU (Central Processing Unit) as the controller. Based on a temperature signal received from the inverter circuit 10 and indicating the temperature of the switching element, a rotation speed signal received from the electric motor 13 and indicating the rotation speed of the electric motor, an accelerator signal received from an external control device such as a vehicle control device and indicating the degree of accelerator depression, and a brake signal indicating the degree of brake depression, the control circuit 11 outputs a control signal (for example, a PWM signal) to the inverter circuit 10 to control the voltage or current in the inverter circuit 10, thereby controlling the power output by the inverter circuit 10 to the electric motor 13 so as to realize the normal operation of the electric motor 13.

The above-mentioned "temperature signal" indicates the temperature of each switching element in the inverter circuit 10 and is estimated based on the phase current flowing in each phase circuit of the inverter device 10 and the temperature detected by the thermistor disposed in the switching element.

Figure 2:
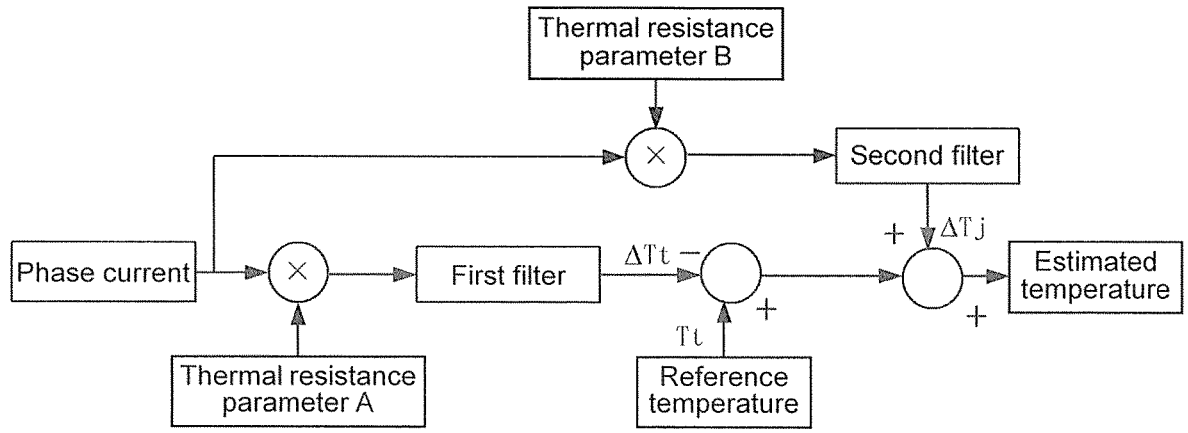
FIG. 2 is a logic diagram showing the temperature estimation logic used in the inverter device 1 for driving the electric motor according to Embodiment 1 of the disclosure.
Figure 3:
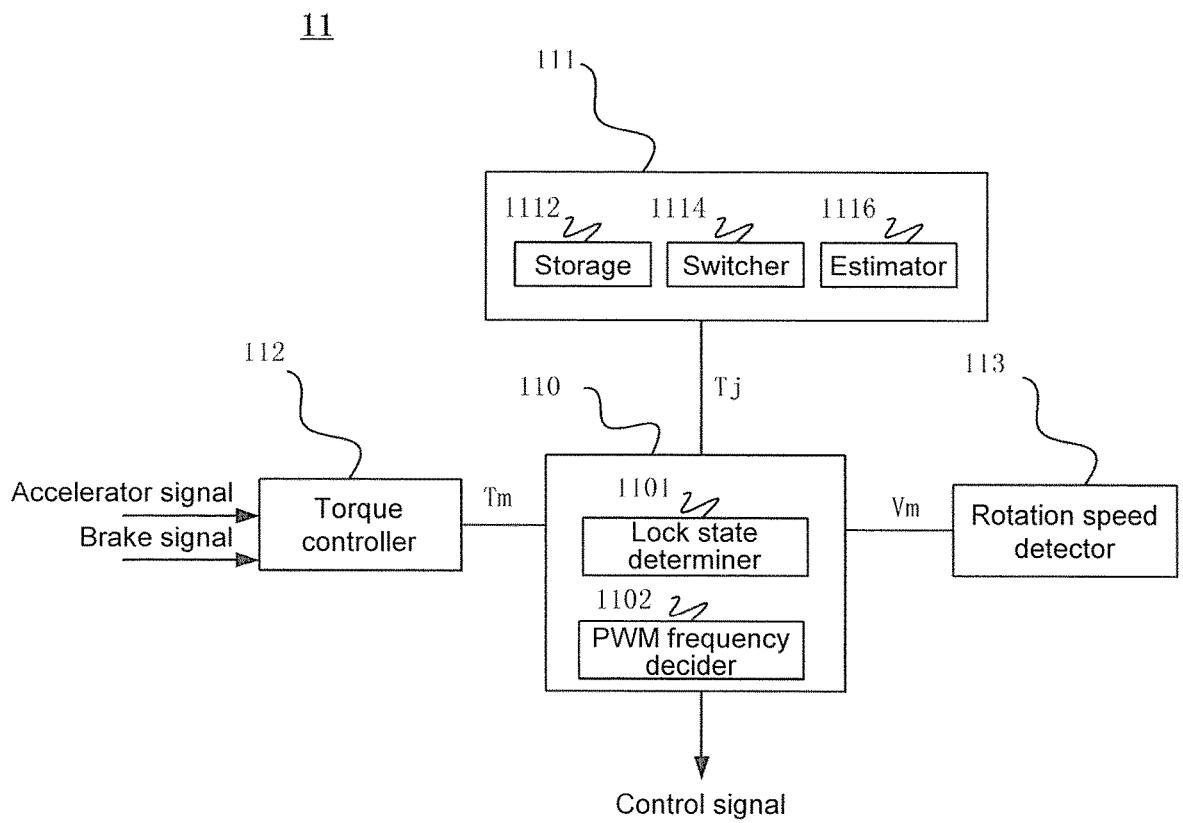
FIG. 3 is a block diagram showing the configuration of the control circuit 11 in the inverter device 1 for driving the electric motor according to Embodiment 1 of the disclosure.

FIG. 2 shows the basic principle of the above-mentioned temperature estimation method. Here, the U-phase circuit in the inverter circuit 10 is taken as an example to estimate the temperature of the U-phase switching element in the U-phase circuit. As shown in the figure, the value of the U-phase current is detected first, and the current value here may be an instantaneous current value or an average current value. The U-phase current value is input to a multiplier, and with reference to a thermal resistance parameter A (the thermal resistance parameter between the thermistor and the U-phase circuit, which may be determined by the value in a pre-stored data table), the output of the multiplier passes through a first filter (since the water temperature in the electric motor cooling mechanism directly affects the result of temperature estimation, for example, a water temperature filter may be used as a low-pass filter), and then the temperature difference $\Delta Tt$ related to the heat dissipation amount of the switching element is obtained and input to a subtractor. In the subtractor, a subtraction operation is performed on the temperature difference $\Delta Tt$ and the reference temperature (that is, the temperature detected by the thermistor) Tt to obtain the temperature with the heat dissipation amount subtracted. At the same time, a multiplication operation is further performed on the U-phase current value in the multiplier with reference to a thermal resistance parameter B (the thermal resistance parameter between the chip substrate and the U-phase circuit, which may be determined by the value in the pre-stored data table), and after passing through a second filter (such as a proportional-integral filter), the temperature difference $\Delta Tj$ related to the heat generation amount of the switching element is obtained. Finally, the temperature data respectively related to the heat generation amount and the heat dissipation amount are added in an adder to obtain the estimated temperature value of the U-phase switching element.

The estimated temperature value obtained by this temperature estimation method is able to appropriately reflect the current overheating condition of the switching element so as to perform overheating protection for the switching element with high accuracy.

Figure 4:
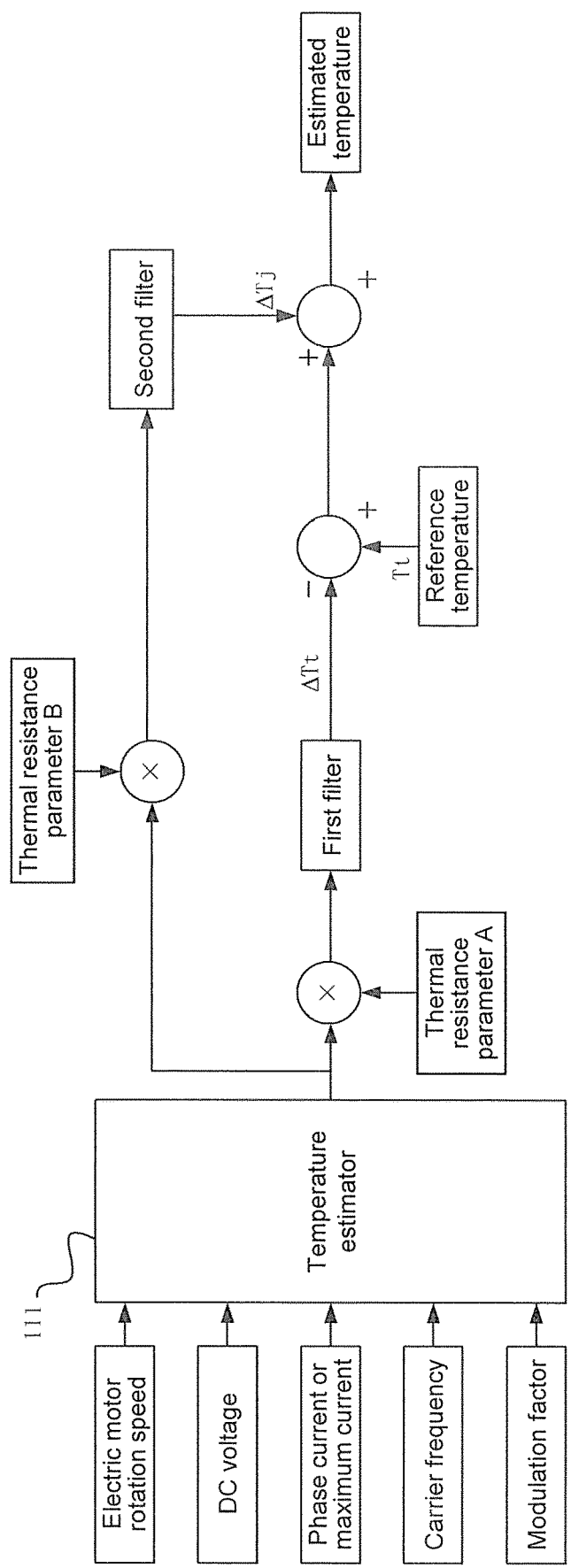
FIG. 4 is a logic diagram showing another temperature estimation logic used in the inverter device 1 for driving the electric motor according to Embodiment 1 of the disclosure.

FIG. 4 is a block diagram showing the configuration of the control circuit 11 in the inverter device 1 of the disclosure. The control circuit 11 mainly includes a controller 110, a temperature estimator 111, a torque controller 112, and a rotation speed detector 113. The controller 110 is defined by, for example, a CPU and outputs a control signal (for example, a PWM control signal) to the inverter circuit 10. A lock state determiner 1101 determines whether the vehicle is currently in the electric motor lock state, that is, a state where the rotation speed of the electric motor is reduced due to an external force but the torque applied to the electric motor is still large. In order to protect the switching elements in the inverter circuit 10 from overheating, the controller 110 is further provided with a PWM frequency decider 1102. When the temperature of the switching element exceeds the threshold and requires overheating protection, the PWM frequency decider 1102 may reduce the carrier frequency of the control signal to be output by the controller 110, thereby reducing the switching frequency of the switching element to realize overheating protection.

The temperature estimator 111 estimates the temperature of each phase switching element according to the temperature estimation method shown in FIG. 2. The temperature estimator 111 is provided with a storage 1112, a switcher 1114, and an estimator 1116. The storage 1112 stores various preset values or parameters (such as the thermal resistance parameter A and the thermal resistance parameter B in FIG. 2), and a plurality of estimation logics used when the temperature estimator 111 performs temperature estimation, for example, one of which is the estimation method shown in FIG. 2. The switcher 1114 switches between a plurality of estimation logics according to the command from the controller 110, and selects the logic to be used for temperature estimation (the details will be described later). The estimator 1116 estimates the temperature Tj of the switching element (as the junction temperature of the IGBT of the switching element) according to the estimation logic to which the switcher 1114 switches.

The torque controller 112 calculates the torque command value to be applied to the electric motor based on the accelerator signal representing the degree of accelerator depression and the brake signal representing the degree of brake depression sent from an accelerator sensor, a brake sensor (not shown), etc., and controls the torque Tm on the electric motor according to the calculated torque command value.

The rotation speed detector 113 detects the current rotation speed Vm of the electric motor by using a rotation speed sensor (not shown) or the like.

When the lock state determiner 1101 determines that the electric motor 13 is currently in the lock state based on the electric motor torque Tm from the torque controller 112 and the electric motor rotation speed Vm from the rotation speed detector 113, it means that the temperature Tj obtained according to the estimation logic currently used by the temperature estimator 111 may deviate from the actual temperature of the switching element. Therefore, the controller 110 sends a command to the switcher 1114 to switch the temperature estimation logic to the estimation logic suitable for the lock state (the details will be described later). The temperature estimator 111 then estimates the temperature Tj of the switching element according to the switched estimation logic. The PWM frequency decider 1102 decides the carrier frequency of the control signal according to the temperature Tj thus obtained, and outputs it to the inverter circuit 10.

As described above, by switching the temperature estimation logic in the electric motor lock state, the temperature of the switching element is estimated with higher accuracy so as to more reliably perform temperature protection for the switching element.

FIG. 2 shows the temperature estimation logic in the normal condition (including vehicle power running and regenerative running). FIG. 4 shows the temperature estimation logic in the above-mentioned electric motor lock state. The configuration of FIG. 4 is basically the same as the configuration shown in FIG. 2, and the main differences lie in the parameters used for calculation and the setting of the second filter. Therefore, the main differences therebetween will be described here, and the common parts will not be repeated.

In the normal condition, for example, in the case of vehicle power running or regenerative running, the temperature of the switching element is estimated by using the phase current of each phase circuit in FIG. 2. In the electric motor lock state, as shown in FIG. 4, the temperature estimator 111 estimates the temperature of the switching element by selecting one parameter, which causes the largest heat loss in the switching element such as an IGBT, from the parameters such as the input electric motor rotation speed, the DC voltage of the power supply 12, each phase current or the maximum value of the three-phase currents, the carrier frequency of the control signal, and the modulation factor (equivalent to the duty ratio of the control signal).

Figure 5:
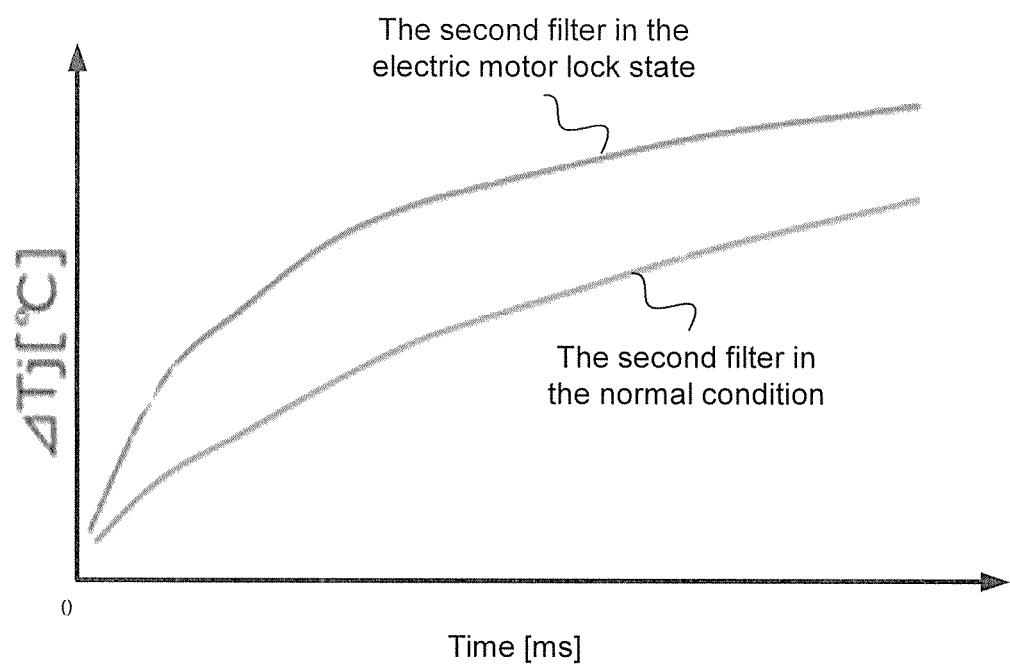
FIG. 5 is a schematic diagram of comparison between the temperature estimation logic of FIG. 4 and the temperature estimation logic of FIG. 2.

Furthermore, in the electric motor lock state, the setting of the second filter is different from the condition in FIG. 2. FIG. 5 is a schematic diagram showing different settings of the second filter in two conditions. As shown in FIG. 5, the temperature difference $\Delta Tj$ obtained in the electric motor lock state is significantly greater than the temperature difference in the normal condition, and the slopes of the two curves in the figure are also different. Such a setting is to cope with the suddenly rising temperature of the switching element of a certain phase in the lock state. Through a simulation experiment, it is known that when the setting of the second filter of FIG. 5 is used in the electric motor lock state, the temperature of the switching element obtained by the estimation logic of FIG. 4 is closer to the actual temperature, and as a result, the accuracy of temperature estimation is improved to reliably perform overheating protection for the switching element.

Figure 6:
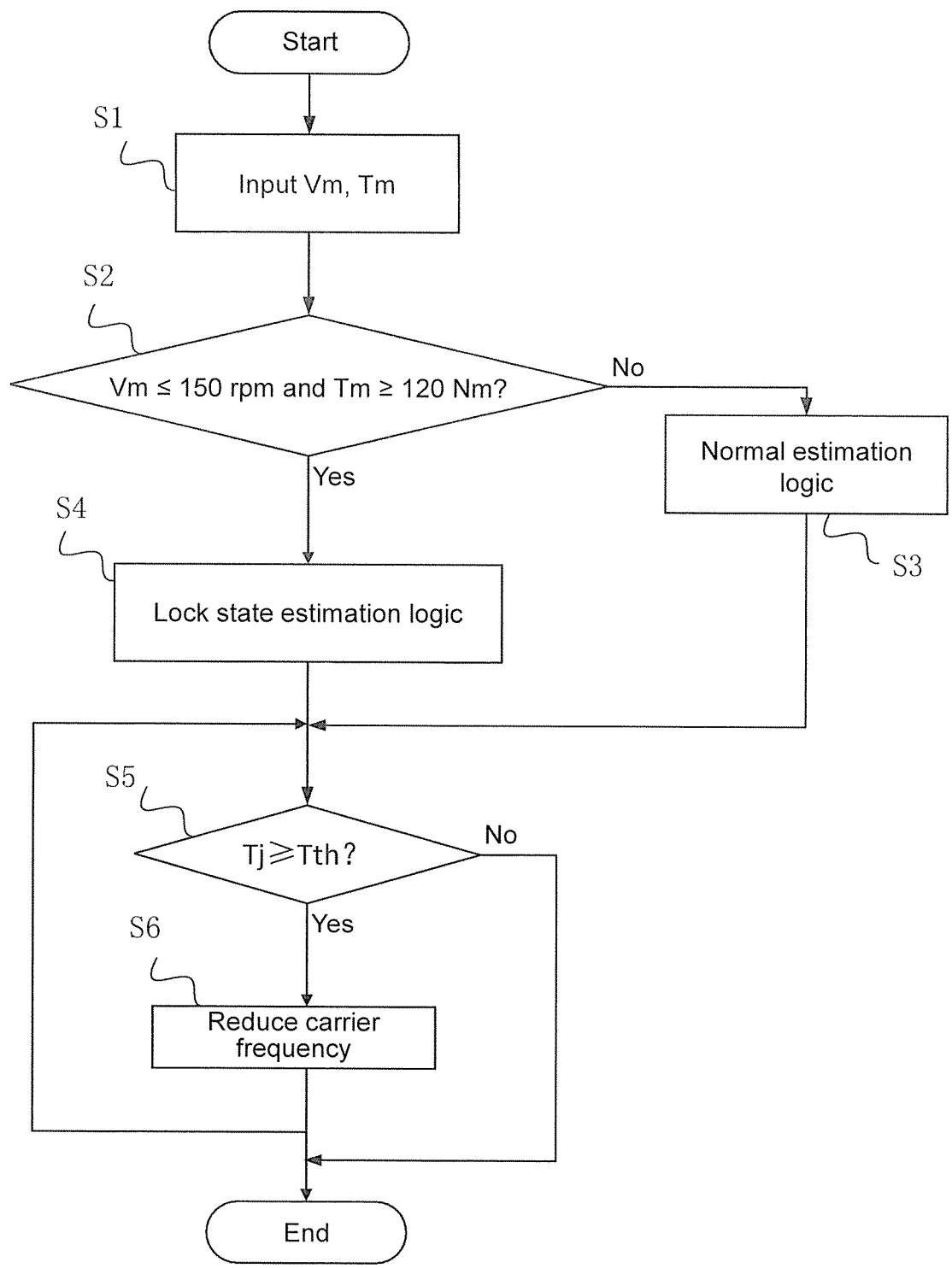
FIG. 6 is a flowchart showing the processing procedure of the control circuit 11 in the inverter device 1 for driving the electric motor according to Embodiment 1 of the disclosure.

Hereinafter, the specific control flow for realizing the overheating protection of the switching element in the inverter device 1 of the disclosure will be described with reference to FIG. 6. FIG. 6 is a flowchart showing the processing procedure in the control circuit 11 of the inverter device 1.

First, in step S1, the control circuit 11 obtains the electric motor rotation speed Vm and the electric motor torque Tm from the rotation speed detector 113 and the torque controller 112 respectively.

In step S2, the lock state determiner 1101 determines whether the electric motor rotation speed Vm is 150 rpm or less and whether the electric motor torque Tm is 120 Nm or more, that is, whether the electric motor is currently in the lock state. In this case, for example, the vehicle encounters an obstacle or the vehicle stalls while climbing a hill, and as a result, the torque applied to the electric motor is still very large (the rated torque is, for example, 140 Nm) but the rotation speed of the electric motor starts to drop suddenly. "150 rpm" here is only an example, and it may be any value within the range of 100 rpm to 150 rpm. "120 Nm" is also only an example, and it may be a larger torque value around the rated torque.

When the electric motor rotation speed Vm≤150 rpm and the electric motor torque Tm≥120 Nm (step S2: Yes), a command is sent to the temperature estimator 111 to cause the switcher 1114 to switch the temperature estimation logic to the lock state estimation logic, so that the temperature estimator 111 estimates the temperature of the switching element by the lock state estimation logic (step S4).

When any one of the electric motor rotation speed Vm>150 rpm and the electric motor torque Tm being less than 120 Nm is satisfied (step S2: No), the temperature estimator 111 estimates the temperature of the switching element according to the normal estimation logic (step S3).

Then, in step S5, it is determined whether the estimated temperature value Tj obtained in steps S3 and S4 is equal to or greater than a specified temperature threshold Tth. The temperature threshold Tth is the overheating threshold of the switching element, for example, 145° C.

If it is determined as "Yes" in step S5, that is, the estimated temperature value Tj exceeds the threshold Tth, it means that the switching element is in the overheated state. Then, the PWM frequency decider 1102 reduces the carrier frequency of the control signal to be output from the control circuit 11 to the inverter circuit 10 (for example, from 8 kHz to 3 kHz) so as to control the switching operation frequency of the switching element (step S6).

If it is determined as "No" in step S5, it means that the temperature of the switching element does not exceed the threshold. Then, the switching element continues to perform the switching operation at the original frequency.

Then, the operations of steps S5 and S6 are repeated until the overheating protection flow of the control circuit 11 for the switching element ends.

According to the inverter device 1 for driving the electric motor and the control method thereof according to Embodiment 1 of the disclosure, when the electric motor enters the lock state and the switching element may be damaged by rapidly increasing heat, the temperature estimation logic is switched so that the estimated temperature is more accurately close to the actual temperature, and each switching element in the inverter circuit is controlled based on the estimated temperature so as to reliably protect the switching element from overheating.

In the above-described Embodiment 1, the carrier frequency of the control signal output from the control circuit 11 to the inverter circuit 10 is reduced to limit the output so as to protect the switching element from overheating. The reduction of the carrier frequency here is only an example of limiting the output. It is also possible to reduce the power consumption of the switching element by reducing the torque command, reducing the current flowing through the switching element, and reducing the duty ratio (modulation rate) of the control signal, so as to reduce the heat loss.

In addition, as shown in FIG. 1, the inverter circuit 10 is a three-phase inverter circuit. When only the switching element of one phase (for example, U phase) of the upper bridge arm is turned on and only the switching element of another phase (for example, V phase) of the lower bridge arm is turned on, the large current flowing in the circuit defined by the connection of these two switching elements to the electric motor 13 may also cause them to rush, and the switching elements may be damaged by overheating before it is detected that the switching elements are in an overheated state. Regarding this, as in Embodiment 1, the temperature estimation logic for the switching elements of the inverter circuit is changed so as to more reliably protect the switching elements from overheating.

In the above-described Embodiment 1, the lock state determiner 1101 provided in the controller 110 is used to determine whether the electric motor is in the lock state based on the rotation speed and torque of the electric motor, and decide whether to change the temperature estimation logic based on the determination result. However, the lock state determiner 1101 may be omitted, and whether to change the temperature estimation logic may be decided by monitoring the change of the rotation speed of the electric motor in real time. For example, in the stage when the electric motor is just started, there is a process in which the rotation speed first rises, then falls, and then rises. That is, when a large torque is applied, the rotation speed of the electric motor rises rapidly to, for example, 150 rpm to 170 rpm, then the rotation speed suddenly drops below 10 rpm due to the force caused by connection to a load, and then the rotation speed rises normally to the speed of power driving or regenerative driving. For the interval in which the rotation speed of the electric motor first rises and then temporarily falls, the inverter device of the disclosure may also be used to change the temperature estimation logic so as to prevent the switching element from being overheated and damaged due to an inaccurate temperature value.

In addition, a state in which the torque of the electric motor is high but the rotation speed is low is generally referred to as an electric motor lock state. That is, when the rotation speed of the rotating electric motor drops suddenly, the electric motor may enter the above-mentioned lock state. In the lock state, the temperature of the switching element rises sharply, and thus it is required to identify the lock state as soon as possible and implement the corresponding overheating protection. Therefore, it is considered to set the rotation speed threshold very high to detect the speed drop as early as possible. Accordingly, in the inverter device for driving the electric motor according to an exemplary embodiment of the disclosure, the rotation speed threshold is in a range of 100 rpm to 150 rpm, and the torque threshold is 120 Nm. Therefore, for an electric motor rotating at, for example, 200 rpm, when the rotation speed drops to 120 rpm and the torque is equal to or greater than the threshold of 120 Nm, it is possible to recognize that the electric motor is currently in the lock state. Assuming that the rotation speed threshold is 50 rpm, the lock state of the electric motor rotating at 200 rpm is recognized only when the rotation speed drops to 50 rpm and the torque is equal to or greater than the threshold of 120 Nm. Therefore, compared to the case where the rotation speed threshold is set to, for example, 50 rpm, the inverter device for driving the electric motor according to the disclosure is able to recognize the lock state earlier, and as a result, implement the overheating protection earlier.

In the inverter device for driving the electric motor according to an exemplary embodiment of the disclosure, the temperature estimation logic includes a normal estimation logic and a lock state estimation logic, and the lock state estimation logic is used to estimate a temperature in response to the rotation speed of the electric motor being equal to or less than the preset rotation speed threshold and the torque of the electric motor being equal to or greater than the preset torque threshold. Therefore, even in the electric motor lock state, the temperature of the switching element is able to be estimated with high accuracy.

In the inverter device for driving the electric motor according to an exemplary embodiment of the disclosure, a difference between a temperature estimated according to the lock state estimation logic and an actual temperature of the switching elements is less than a difference between a temperature estimated according to the normal estimation logic and the actual temperature of the switching elements under a same condition. That is, in the electric motor lock state, the temperature estimation logic is able to be changed to a more suitable estimation logic. Therefore, even in the electric motor lock state, the temperature of the switching element is able to be estimated with high accuracy.

In the inverter device for driving the electric motor according to an exemplary embodiment of the disclosure, the control circuit limits output of the inverter circuit to the electric motor in response to a temperature of the switching elements estimated according to the temperature estimation logic exceeding a preset temperature threshold. Therefore, the output of the inverter is able to be limited by using the estimated temperature that is as close to the actual temperature as possible, which as a result realizes highly accurate overheating protection.

In the inverter device for driving the electric motor according to an exemplary embodiment of the disclosure, the control circuit limits the output of the inverter circuit to the electric motor by reducing a carrier frequency of a control signal to be output to the inverter circuit.

In the inverter device for driving the electric motor according to an exemplary embodiment of the disclosure, the inverter circuit is a three-phase inverter circuit which includes six switching elements that respectively define three-phase circuits of an upper bridge arm and a lower bridge arm, and the control circuit changes the temperature estimation logic of the switching elements of the inverter circuit in response to only any one phase of the upper bridge arm is turned on and only any one of the other two phases of the lower bridge arm is turned on. In the electric motor lock state, the current is concentrated on one of the three phases, and at this time, the switching element that is turned on corresponding to this phase may overheat and fail. However, by adopting the above-described configuration, when the current is concentrated on a certain phase, the temperature is estimated with high accuracy, and as a result, the limit on the output of the inverter is able to be appropriately controlled.

In addition, when the electric motor is just started, it is possible to enter the electric motor lock state. Specifically, after the electric motor starts to rotate from a stationary state, the rotation speed may first rise and then fall. In this case, the temperature of the switching element in the inverter rises rapidly, and the temperature of the switching element may not be accurately estimated by using the normal estimation logic, which is the temperature estimation logic during the normal operation. Therefore, an inverter device for driving an electric motor according to an exemplary embodiment of the disclosure includes: an inverter circuit including a plurality of switching elements; and a control circuit controlling the inverter circuit. The control circuit changes a temperature estimation logic of the switching elements of the inverter circuit while a rotation speed of the electric motor increases to a first rotation speed value and then temporarily drops equal to or less than a second rotation speed value in a stage when the electric motor is just started.

In the inverter device for driving the electric motor according to an exemplary embodiment of the disclosure, the first rotation speed value is 150 rpm, and the second rotation speed value is 10 rpm. Therefore, even if the rotation speed temporarily drops in the stage when the electric motor is just started, the temperature is able to be estimated with high accuracy.

It is possible to freely combine the embodiments without departing from the scope of the disclosure, modify any constituent elements of the embodiments, or omit any constituent elements of the embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An inverter device for driving an electric motor, comprising:
    an inverter circuit comprising a plurality of switching elements; and
    a control circuit controlling the inverter circuit,
    wherein in response to a rotation speed of the electric motor being equal to or less than a preset rotation speed threshold and a torque of the electric motor being equal to or greater than a preset torque threshold, the control circuit changes a temperature estimation logic of the switching elements of the inverter circuit,
    the temperature estimation logic comprises a normal estimation logic and a lock state estimation logic,
    the lock state estimation logic is used to estimate a temperature in response to the rotation speed of the electric motor being equal to or less than the preset rotation speed threshold and the torque of the electric motor being equal to or greater than the preset torque threshold, and
    a difference between a temperature estimated according to the lock state estimation logic and an actual temperature of the switching elements is less than a difference between a temperature estimated according to the normal estimation logic and the actual temperature of the switching elements under a same condition.

2. The inverter device for driving the electric motor according to claim 1, wherein
    the inverter circuit is a three-phase inverter circuit which comprises six switching elements that respectively define three-phase circuits of an upper bridge arm and a lower bridge arm, and
    the control circuit changes the temperature estimation logic of the switching elements of the inverter circuit in response to only any one phase of the upper bridge arm is turned on and only any one of the other two phases of the lower bridge arm is turned on.

* * * * *